United States Patent
Hayzen et al.

(10) Patent No.: US 11,148,244 B2
(45) Date of Patent: Oct. 19, 2021

(54) VIBRATION SPECTRA WINDOW ENHANCEMENT

(71) Applicant: Computational Systems, Inc., Knoxville, TN (US)

(72) Inventors: Anthony J. Hayzen, Knoxville, TN (US); Stewart V. Bowers, III, Knoxville, TN (US); Christopher G. Hilemon, Knoxville, TN (US); John W. Willis, Oak Ridge, TN (US)

(73) Assignee: Computational Systems, Inc., Knoxville, TN (US)

( * ) Notice: Subject to any disclaimer, the term of this patent is extended or adjusted under 35 U.S.C. 154(b) by 345 days.

(21) Appl. No.: 16/531,772

(22) Filed: Aug. 5, 2019

(65) Prior Publication Data

US 2021/0039218 A1    Feb. 11, 2021

(51) Int. Cl.
  *B23Q 17/12*   (2006.01)
  *G06F 17/14*   (2006.01)
  *G06F 3/147*   (2006.01)
  *G05B 19/406*  (2006.01)

(52) U.S. Cl.
  CPC .......... *B23Q 17/12* (2013.01); *G05B 19/406* (2013.01); *G06F 3/147* (2013.01); *G06F 17/142* (2013.01); *G05B 2219/37435* (2013.01)

(58) Field of Classification Search
  CPC ............... B23Q 17/12; G05B 19/406; G05B 2219/37435; G06F 3/147; G06F 17/142
  USPC ........................................................ 702/56
  See application file for complete search history.

(56) References Cited

U.S. PATENT DOCUMENTS

| | | | |
|---|---|---|---|
| 9,389,761 B2 | 7/2016 | Roaldson et al. | |
| 10,168,889 B2 | 1/2019 | Freidhof | |
| 2002/0063712 A1 | 5/2002 | Ilic | |
| 2007/0247462 A1 | 10/2007 | Bell et al. | |
| 2008/0007555 A1* | 1/2008 | Vrba | G06T 11/20 345/440 |
| 2008/0195350 A1* | 8/2008 | Miyano | G06F 17/141 702/147 |
| 2008/0221811 A1 | 9/2008 | Slemp et al. | |
| 2013/0326383 A1 | 12/2013 | Gatti et al. | |
| 2018/0321836 A1 | 11/2018 | Tappan et al. | |

FOREIGN PATENT DOCUMENTS

| | | |
|---|---|---|
| CN | 108760295 B | 4/2020 |
| DE | 3017237 C2 | 5/1985 |

* cited by examiner

*Primary Examiner* — Allen C Wong
(74) *Attorney, Agent, or Firm* — Luedeka Neely Group, P.C.

(57) ABSTRACT

While monitoring the condition of a machine, vibration data is often collected for analysis by an experienced analyst. Systems and methods for analyzing vibration spectra associated with machine condition monitoring are disclosed herein. A system may be configured to collect vibration data from one or more vibration sensors, generate a vibration spectrum of the vibration data, and generate a spectral plot of the vibration spectrum. The system may receive a selection of a region of the spectral plot and generate a modifiable window of the vibration spectrum that is embedded within the spectral plot. The system may display a set of graphing tools along with the modifiable window that enable a user to make modifications to the window. The system may detect the modifications and update the modifiable window accordingly.

22 Claims, 5 Drawing Sheets

VIBRATION SPECTRA WINDOW ENHANCEMENT

FIELD

This invention relates to the field of machine condition monitoring. More particularly, this invention relates to systems and methods for analysis of vibration spectra associated with machine condition monitoring.

BACKGROUND

Unless otherwise indicated herein, the materials described in this section are not prior art to the claims in this application and are not admitted to be prior art by inclusion in this section.

While monitoring the condition of a machine, vibration data is often collected and can be used to identify loose parts, off-balance components, or failing components. Vibration data typically is collected and analyzed as a vibration spectrum. It takes a keen analyst, often someone with years of experience, to accurately analyze vibrational spectra, classify the characteristics of the spectrum, and make determinations about the condition of the machine and its components.

However, even for the seasoned professional, there are still difficulties and inefficiencies that arise. For example, a particular portion of the vibration spectrum may be of interest to the analyst, but the peaks present in that portion may have small amplitudes relative to the entire spectrum and are thus difficult to distinguish. In another example, a particular peak may present characteristics that would be better analyzed in another domain. In each case the analyst would be required to return to the gathered data and create a second plot with the desired properties. Moreover, current methods of analysis present additional consequences. In the example where the analyst has amplified the portion with small peaks, the analyst may be unable to compare the portion to the rest of the spectrum because other peaks are out of range of the displayed spectrum. In the case where the plotted variable has been changed, the other regions of the plot may become indecipherable upon conversion. Thus, in order to compare the portion to the rest of the spectrum, the analyst must repeatedly replot the data and open many windows. In either case, present methods inefficiently utilize computing resources as well as the time of the analyst.

What is needed, therefore, are methods and apparatuses for comparative analysis of vibration spectra associated with machine condition monitoring.

SUMMARY

The present disclosure is generally directed to techniques for comparative analysis of vibration spectra associated with machine condition monitoring.

Some embodiments described herein provide an apparatus for analyzing vibration spectra associated with machine condition monitoring. The apparatus includes one or more vibration sensors configured to collect machine vibration data, and a processor that is communicatively coupled to the one or more vibration sensors. The processor is configured to:

perform a Fast Fourier Transform on the machine vibration data to generate a vibration spectrum that defines an amplitude of a first variable as a function of frequency;

generate a spectral plot of the vibration spectrum for display on a display device, the spectral plot having an x-axis indicative of frequency and a first y-axis indicative of the amplitude of the first variable;

generate a modifiable window within the spectral plot, the modifiable window displaying at least a portion of the vibration spectrum with reference to a second y-axis; and receive input from a user interface device that specifies one or both of a change in position of the modifiable window along the x-axis of the spectral plot and a change in scale of the second y-axis.

In some embodiments, the first y-axis of the spectral plot includes a first label and a first scale, and the second y-axis of the modifiable window includes a second label and a second scale.

In some embodiments, the first label and the first scale are different from the second label and the second scale.

In some embodiments, the processor is further configured to:

generate the modifiable window having a leading edge corresponding to a first frequency in the x-axis and a trailing edge corresponding to a second frequency in the x-axis;

receive input from the user interface device that specifies one or both of a movement of position of the leading edge along the x-axis and a movement of position of the trailing edge along the x-axis; and regenerate the modifiable window having one or both of the leading edge and the trailing edge repositioned according to the one or more movements specified by the input from the user interface.

In some embodiments, the processor is further configured to:

receive input from the user interface device that specifies a change of scale of the second y-axis; and regenerate the modifiable window having the scale of the second y-axis changed as specified by the input from the user interface. In some embodiments, the processor is further configured to:

receive input from the user interface device that specifies a second variable to be plotted within the modifiable window instead of the first variable; and regenerate the modifiable window to display a spectral plot of the second variable as a function of frequency.

In some embodiments, the spectral plot of the second variable is generated by applying a transfer function to the first variable within a frequency range defined by the modifiable window.

In some embodiments, the processor is further configured to update a label and a scale of the second y-axis to conform with the second variable.

In some embodiments, the processor is further configured to generate a plot of the transfer function that is applied to generate the spectral plot of the second variable.

In some embodiments, the processor is further configured to receive input from the user interface device indicating a selection of the first variable to be displacement, velocity, or acceleration.

In some embodiments, the processor is further configured to:

generate the spectral plot of the vibration spectrum in a first color; and generate the modifiable window in a second color that is different from the first color.

In another aspect, embodiments described herein are directed to a method for analyzing vibration spectra associated with machine condition monitoring. A preferred embodiment of the method includes the following steps:

(a) collecting machine vibration data from one or more vibration sensors;

(b) performing a Fast Fourier Transform on the machine vibration data to generate a vibration spectrum that defines an amplitude of a first variable as a function of frequency;

(c) generating a spectral plot of the vibration spectrum for display on a display device, the spectral plot having an x-axis indicative of frequency and a first y-axis indicative of the amplitude of the first variable;

(d) generating a modifiable window within the spectral plot, the modifiable window displaying at least a portion of the vibration spectrum with reference to a second y-axis; and (e) receiving input from a user interface device that specifies one or both of a change in position of the modifiable window along the x-axis of the spectral plot and a change in scale of the second y-axis.

In some embodiments, the first y-axis of the spectral plot includes a first label and a first scale, and the second y-axis of the modifiable window includes a second label and a second scale.

In some embodiments, the first label and the first scale are different from the second label and the second scale.

In some embodiments, the method comprises:

step (d) including generating the modifiable window having a leading edge corresponding to a first frequency in the x-axis and a trailing edge corresponding to a second frequency in the x-axis;

(e) receiving input from the user interface device that specifies one or both of a movement of position of the leading edge along the x-axis and a movement of position of the trailing edge along the x-axis; and (f) regenerating the modifiable window having one or both of the leading edge and the trailing edge repositioned according to the one or more movements specified by the input from the user interface.

In some embodiments, the method comprises:

step (e) including receiving input from the user interface device that specifies a change of scale of the second y-axis; and (f) regenerating the modifiable window having the scale of the second y-axis changed as specified by the input from the user interface.

In some embodiments, the method includes:

(f) receiving input from the user interface device that specifies a second variable to be plotted within the modifiable window instead of the first variable; and (g) regenerating the modifiable window to display a spectral plot of the second variable as a function of frequency.

In some embodiments, step (g) includes applying a transfer function to the first variable within a frequency range defined by the modifiable window.

In some embodiments, the method includes updating a label and a scale of the second y-axis to conform with the second variable.

In some embodiments, the method includes generating a plot of the transfer function that is applied to generate the spectral plot of the second variable.

In some embodiments, the method includes receiving input from the user interface device indicating a selection of the first variable to be displacement, velocity, or acceleration.

In some embodiments of the method:

step (c) comprises generating the spectral plot of the vibration spectrum in a first color; and step (d) comprises generating the modifiable window in a second color that is different from the first color.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Other embodiments of the invention will become apparent by reference to the detailed description in conjunction with the figures, wherein elements are not to scale so as to more clearly show the details, and wherein like reference numbers indicate like elements throughout the several views, and wherein.

DETAILED DESCRIPTION

Figure 1:
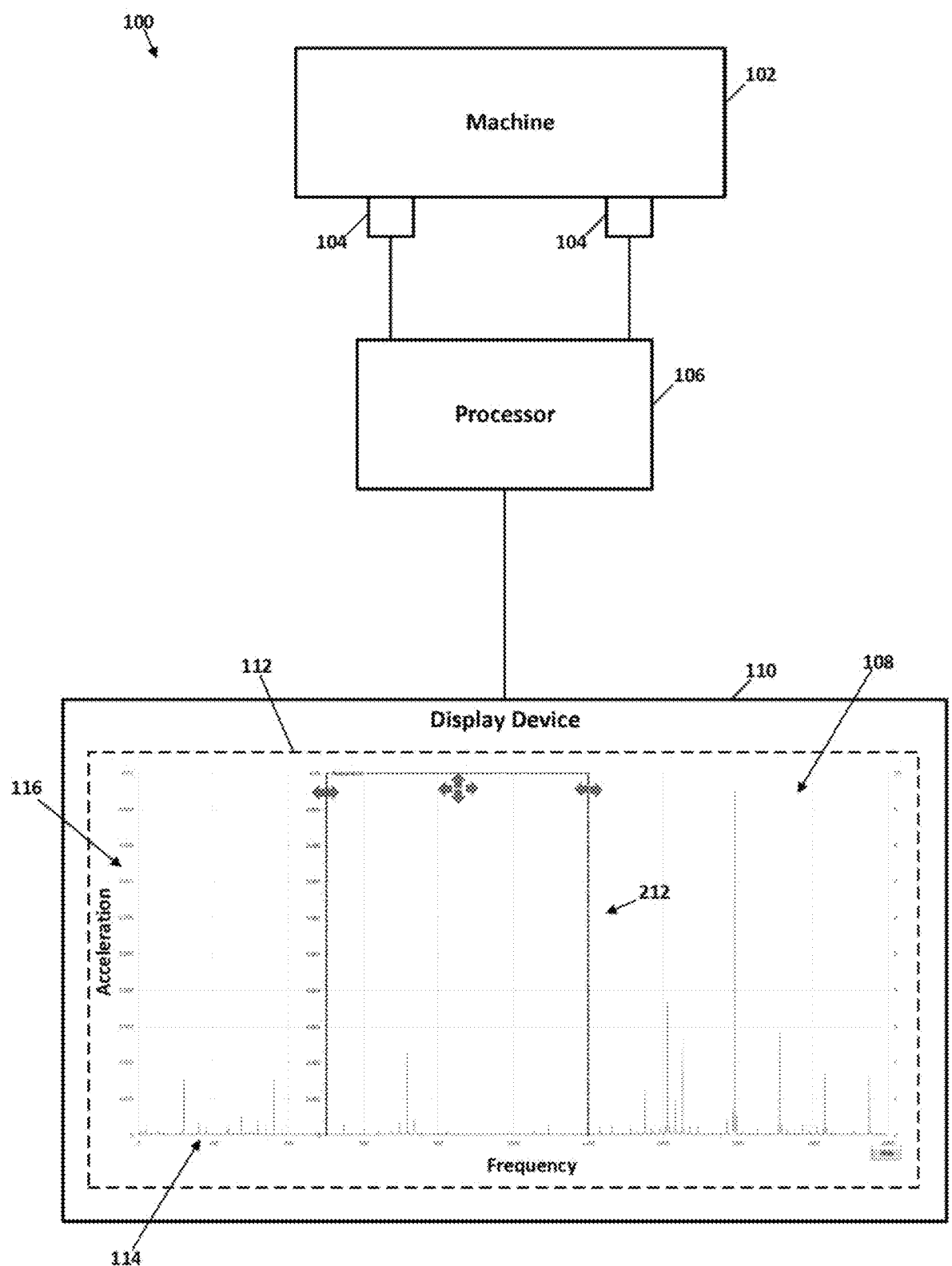
FIG. 1 depicts components of an apparatus for analysis of vibration spectra associated with machine condition monitoring according to a preferred embodiment.

In the following detailed description, reference is made to the accompanying drawings, which form a part hereof. The illustrative embodiments described in the detailed description, drawings, and claims are not meant to be limiting in scope. Other embodiments may be utilized, and other changes may be made without departing from the spirit or scope of the subject matter presented herein. This disclosure is generally directed to methods, apparatuses, systems, and/or devices related to analyzing and displaying vibration spectra associated with machine condition monitoring.

Apparatuses and systems for analyzing vibration spectra associated with machine condition monitoring may include one or more vibration sensors configured for monitoring machine displacement, velocity, acceleration, or any combination of the three. In various embodiments, the vibration sensors may be microelectromechanical system (MEMS) sensors, piezoresistive sensors, piezoelectric sensors, electromagnetic sensors, laser-displacement sensors, acoustic sensors, or the like. As can be appreciated, the vibration sensors should not be interpreted as limited to a particular mode of collecting machine vibration data. Vibration data generally refers to the data collected by the vibration sensors, and characteristics of the data may vary based on the sensor(s) disposed in a particular embodiment.

According to some embodiments, systems and apparatuses may include a computer hardware device. The computer hardware device may be a server, a desktop computer, a special purpose computing device, a tablet computer, a smart phone, or a component level processor. The computer hardware device includes, among other things, a memory configured to store instructions and one or more processors that are communicatively coupled with the memory.

The computer hardware device may also include other components including, but not limited to, one or more data storage devices, which may be removable and non-removable, audio and video output components, peripheral components, and communication components. Peripheral components may include input devices (e.g., keyboard, mouse, pen, voice input device, touch input device, etc.) and other peripheral devices (e.g. printer, scanner, etc.) which may communicate via a serial bus interface, such as a USB port, or parallel port interface. A communication component may include, among other things, a network controller configured to facilitate communications with one or more other computing devices over a network communication link via one or more communication ports, such as an ethernet port, or via a wireless network. The one or more other computing devices are not limited to devices that are on the same premises as the computer hardware device and may include computing devices such as servers at a remote datacenter.

Additionally, an apparatus, system, or a component of an apparatus or system, such as a processor, may be communicatively coupled with a display device. The display device may be a monitor, television, projector, virtual reality (VR) device, or a display device with additional capabilities, such as the touch screen of a cell phone or tablet device. Generally speaking, any type of display device may be employed in conjunction with the embodiments described herein.

Figure 5:
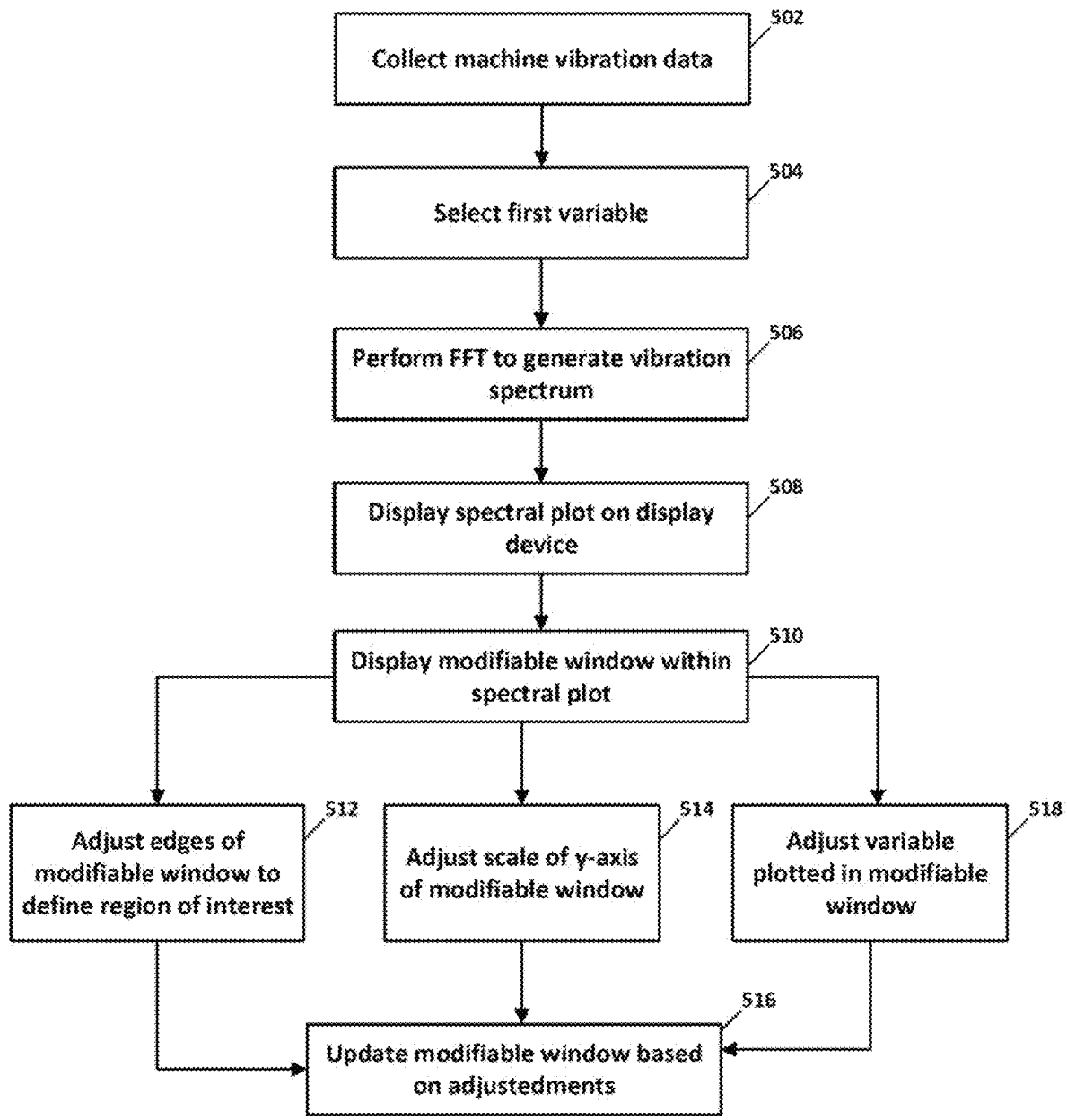
FIG. 5 depicts a method for generation of vibration spectral graphics according to a preferred embodiment.

FIG. 1 depicts a preferred embodiment of an apparatus 100 for collection and analysis of vibration spectral data associated with machine condition monitoring. FIG. 5 depicts steps of an embodiment of a method that may be performed using the apparatus 100. The apparatus 100 includes one or more vibration sensors 104 attached to a machine 102, a processor 106 that receives vibration signals from the one or more sensors 104 and processes vibration data based on the vibration signals, and a display device 110 for displaying vibration data to an analyst.

The one or more vibration sensors 104 are configured to collect vibration data associated with the machine 102 (FIG. 5 step 502). For example, the one or more vibrations sensors 104 may include piezoelectric accelerometers mounted on various regions of the machine 102. The vibration signals generated by the one or more vibration sensors 104 are conditioned and converted to digital data prior to being analyzed by the processor 106.

In a preferred embodiment, the processor 106 performs an FFT on the time-domain vibration data to generate a vibration spectrum (step 506). Generally, the vibration spectrum defines an amplitude of a first variable as a function of frequency. The first variable may be displacement, velocity, acceleration, or other vibration amplitude value. The first variable may be a default value determined by the programming of the processor 106, or it may be selected by a user via a user interface (UI) (step 504). For example, the processor 106 may determine a default first variable based on the properties of the one or more vibration sensors 104.

In the preferred embodiment, the processor 106 is configured to generate a spectral plot 108 of the vibration spectrum and display the spectral plot 108 on the display device 110 (step 508). The spectral plot 108 may include an x-axis 114 and a y-axis 116. The spectral plot depicts the amplitude of the first variable on the y-axis 116 and its frequency on the x-axis 114. Each axis of the spectral plot preferably includes a label and scale that reflect the variable plotted on the axis. For example, the x-axis 114 shown in FIG. 1 includes a label indicating Frequency is plotted along the axis in Hertz (Hz). The scale of the x-axis 114 ranges from 0 Hz to 2000 Hz with gridlines dividing the range every 200 Hz.

Figure 2:
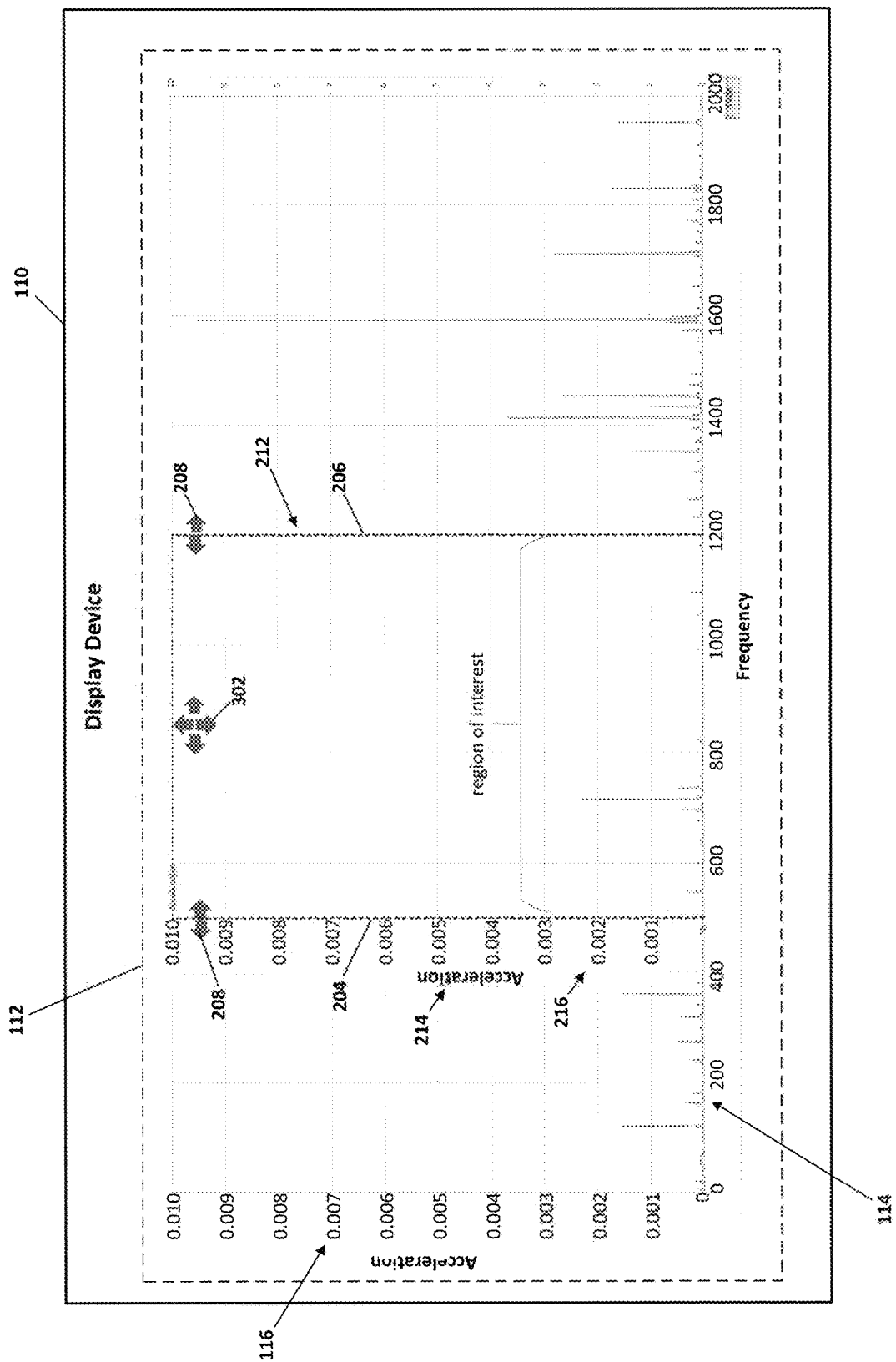
FIGS. 2, 3, and 4 depict vibration spectral graphics produced by the processor of the apparatus depicted in FIG. 1.

As shown in FIG. 2, the processor 106 may also be configured to generate the display of a modifiable window 212 within the spectral plot 108 based on input from the user interface 112 (step 510). The modifiable window 212 is preferably defined at least in part by a range of frequencies bounded by a leading edge 204 and a trailing edge 206.

In preferred embodiments, the leading and trailing edges 204 and 206 extend linearly from the bottom of the spectral plot 108 to the top. The edges 204 and 206 may include selectable properties such as thickness (i.e. weight), color, or style (i.e. dashed, dotted, etc.). The leading edge 204 and the trailing edge 206 may be moved on the spectral plot 108 by a user to define a range of frequencies within the spectral plot, thereby selecting a region of interest (step 512). The user may move the leading edge 204 and the trailing edge 206 on the spectral plot 108 using a peripheral component, such as a mouse or touchpad, to select and drag each edge to a desired position on the spectral plot 108. For example, the user may click on the arrows 208 to move the leading and trailing edges 204 and 206 left or right along the x-axis of the spectral plot 108 to a desired position.

In some embodiments, the modifiable subplot 212 is considered to be independent from the spectral plot to the extent that it is plotted with its own y-axis, referred to herein as a second y-axis, having a scale 216 and label 214 that are independent of the scale and label of the y-axis 116 of the rest of the spectral plot 108. The modifiable window 212 may also be generated in a different color than the rest of the spectral plot 108. The label 214 and the scale 216 may be automatically determined by the processor 106 based on the data plotted within the modifiable window 212.

In a preferred embodiment, after the processor 106 detects that the range of frequencies between the leading edge 204 and the trailing edge 206 has changed due to movement of the edges by the user, the processor 106 may regenerate the modifiable window 212 within the spectral plot 108 to display the region of interest with the adjusted frequency boundaries (step 516).

As shown in FIG. 2, placement of the modifiable window 212 within the spectral plot 108 may be adjusted using a tool 302 comprising left-right arrows and up-down arrows. In a preferred embodiment, the user may click on the tool 302 using a mouse or touchpad to implement a drag-and-drop function to move the entire modifiable window 212 to the left or right along the frequency scale 114 of the spectral plot 108. Alternatively, the user may click on the left and right arrows of the tool 302 to incrementally move the entire window 212 to the left or right along the frequency scale 114 of the spectral plot 108.

The scale 216 of the second y-axis of the modifiable window 212 may also be adjusted using the tool 302, thereby increasing or decreasing the amplitude of vibration spectral peaks within the region of interest defined by the modifiable window 212. For example, the user may incrementally decrease the scale 216 of the modifiable window 212 by clicking on the up arrow of the tool 302, or by scrolling up on the scroll wheel of a mouse (step 514). The processor 106 detects the change of the scale of the second y-axis and rescales the amplitude of the vibration spectrum within the modifiable window 212 to reflect the change (step 516). In one embodiment, the processor 106 implements an auto-ranging function to automatically adjust the scale 216 of the second y-axis in accordance with changes in amplitude of the largest amplitude peak within the modifiable window 212, wherein the changes are due to movement of the modifiable window 212 within the spectral plot 108 or due to changes in measured vibration data.

Figure 3:
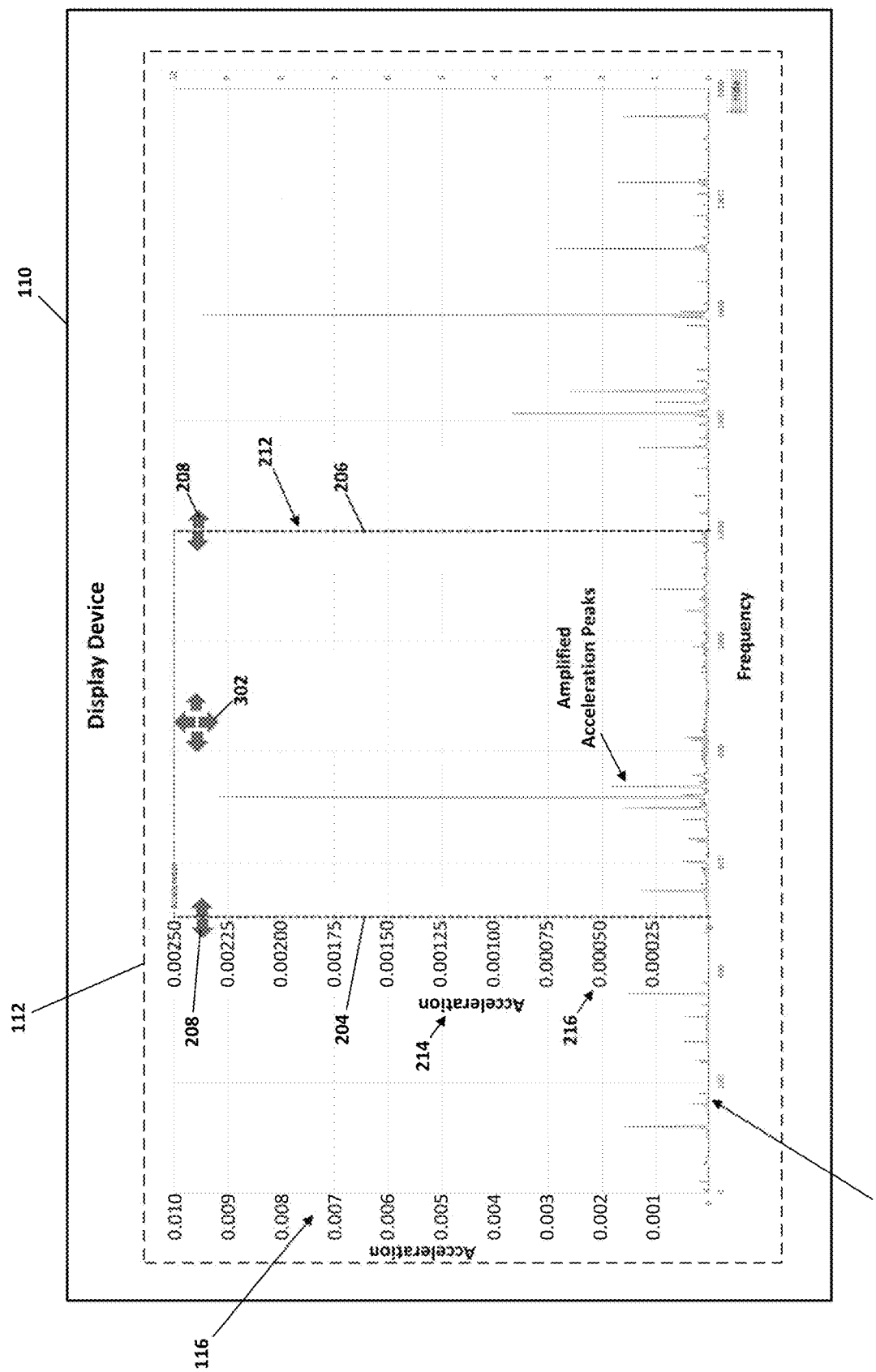

In the example of FIG. 3, the scale of the second y-axis has been zoomed in (scale decreased as compared to the scale of the plot in FIG. 2), and the vibration spectrum has been rescaled (amplified) to conform with the change. In the preferred embodiment, the processor 106 also automatically updates the amplitude values listed in the scale 216 of the second y-axis to conform with the change. For example, the scale 216 of the second y-axis has been reduced from 0-0.010 (FIG. 2) to 0-0.00250 (FIG. 3).

Figure 4:
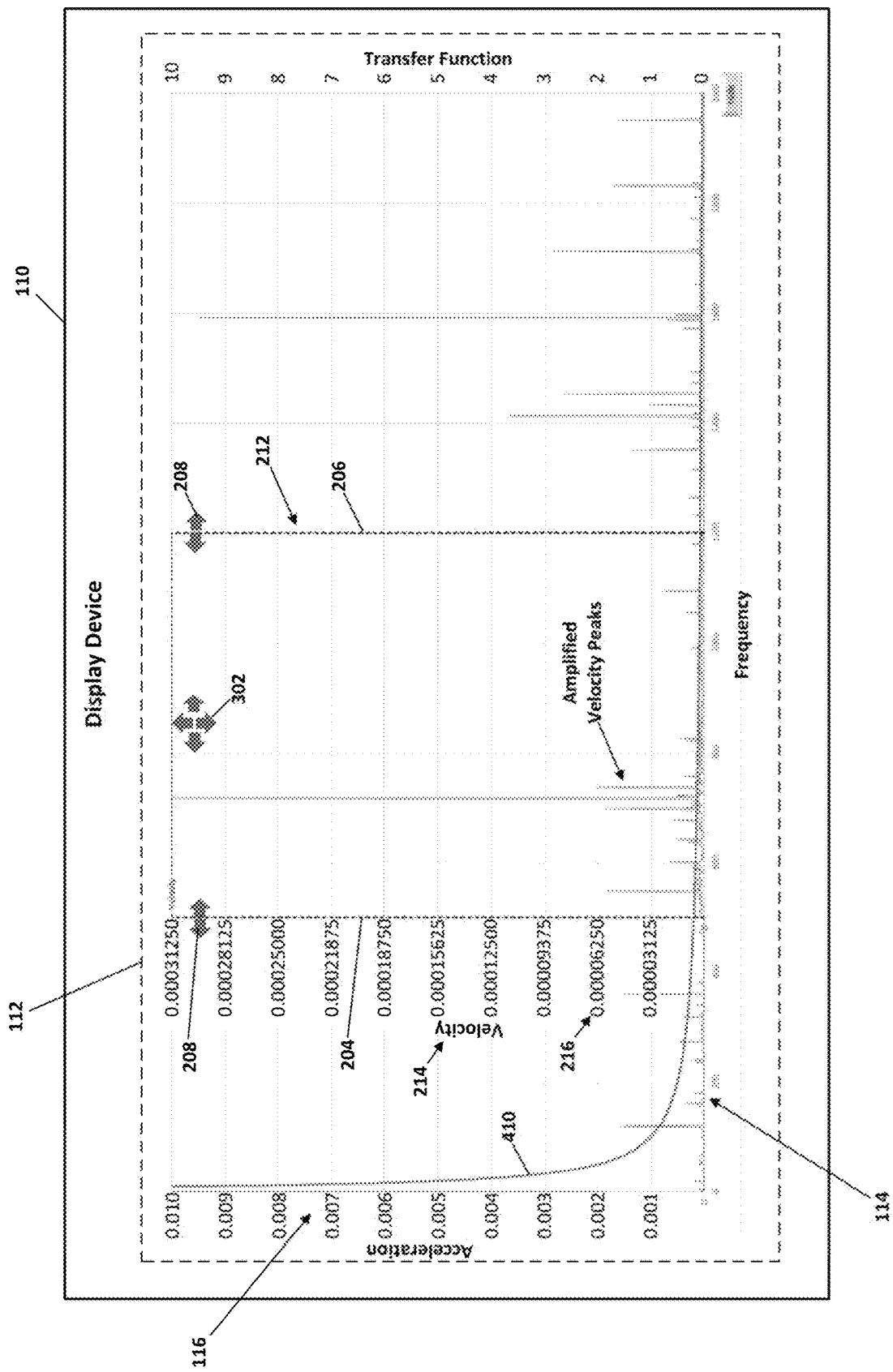

In a preferred embodiment, the user may select a second variable to be plotted within the modifiable window 212 that is different from the first variable plotted in the rest of the spectral plot (step 518). For example, as shown in FIG. 4, the second variable plotted within the modifiable window 212 may be selected to be velocity, whereas the first variable plotted within the rest of the spectral plot 108 may be acceleration. In some embodiments, the selection of the second variable is accomplished using a dropdown menu displayed somewhere within the user interface 112. For example, the dropdown menu may provide options of displacement, velocity, and acceleration for the second variable.

Upon selection of the second variable, the processor 106 preferably applies a transfer function to convert the vibration spectrum from the first variable to the second variable within the frequency range defined by the modifiable window 212. The transfer function is selected based on the first variable and the second variable. For example, acceleration may initially be plotted in the spectral plot 108, including within the modifiable window 212 as shown in FIG. 3. The user may select the second variable to be velocity to be plotted in the modifiable window 212. (FIG. 4.) The processor 106 then uses an integration transfer function to convert acceleration to velocity, and update the plot within the modifiable window 212 accordingly (step 516). In a preferred embodiment, the spectral peaks of the second variable plotted within the modifiable window 212 are in a different color than the spectral peaks of the first variable plotted within the rest of the spectral plot 108.

Additionally, the processor 106 may update the label 214 and the scale 216 of the second y-axis of the modifiable window 212 to conform with the change from the first variable to the second variable. For example, the label 214 and the scale 216 of the second y-axis shown in FIG. 4 have been updated to reflect the change from acceleration to velocity.

As shown in FIG. 4, the processor 106 may also generate a plot of the transfer function 410 to be displayed along with the vibration spectrum and the modifiable window 212 (step 518). In a preferred embodiment, the processor 106 may plot the transfer function 410 in a color or line style that is different from the colors or line styles of the first and second variables. A third y-axis 412 for the amplitude of the transfer function may also be generated by the processor 106 and include a label and a scale that are independent from the labels and scales of the first and second y-axes. As shown in FIG. 4, the third y-axis 412 may be labeled "Transfer Function" and include an appropriate scale for the selected transfer function.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for analyzing vibration spectra associated with machine condition monitoring, the apparatus comprising:
   one or more vibration sensors configured to collect machine vibration data; and
   a processor communicatively coupled to the one or more vibration sensors and configured to:
      perform a Fast Fourier Transform on the machine vibration data to generate a vibration spectrum that defines an amplitude of a first variable as a function of frequency;
      generate a spectral plot of the vibration spectrum for display on a display device, the spectral plot having an x-axis indicative of frequency and a first y-axis indicative of the amplitude of the first variable;
      generate a modifiable window within the spectral plot, the modifiable window displaying at least a portion of the vibration spectrum with reference to a second y-axis; and
      receive input from a user interface device that specifies one or both of a change in position of the modifiable window along the x-axis of the spectral plot and a change in scale of the second y-axis.

2. The apparatus of claim 1, wherein the first y-axis of the spectral plot includes a first label and a first scale, and the second y-axis of the modifiable window includes a second label and a second scale.

3. The apparatus of claim 2, wherein the first label and the first scale are different from the second label and the second scale.

4. The apparatus of claim 1 wherein the processor is further configured to:
   generate the modifiable window having a leading edge corresponding to a first frequency in the x-axis and a trailing edge corresponding to a second frequency in the x-axis;
   receive input from the user interface device that specifies one or both of a movement of position of the leading edge along the x-axis and a movement of position of the trailing edge along the x-axis; and
   regenerate the modifiable window having one or both of the leading edge and the trailing edge repositioned according to the one or more movements specified by the input from the user interface.

5. The apparatus of claim 1 wherein the processor is further configured to:
   receive input from the user interface device that specifies a change of scale of the second y-axis; and
   regenerate the modifiable window having the scale of the second y-axis changed as specified by the input from the user interface.

6. The apparatus of claim 1 wherein the processor is further configured to:
   receive input from the user interface device that specifies a second variable to be plotted within the modifiable window instead of the first variable; and
   regenerate the modifiable window to display a spectral plot of the second variable as a function of frequency.

7. The apparatus of claim 6 wherein the spectral plot of the second variable is generated by applying a transfer function to the first variable within a frequency range defined by the modifiable window.

8. The apparatus of claim 7 wherein the processor is further configured to generate a plot of the transfer function that is applied to generate the spectral plot of the second variable.

9. The apparatus of claim 6 wherein the processor is further configured to update a label and a scale of the second y-axis to conform with the second variable.

10. The apparatus of claim 1 wherein the processor is further configured to receive input from the user interface device indicating a selection of the first variable to be displacement, velocity, or acceleration.

11. The apparatus of claim 1 wherein the processor is further configured to:
generate the spectral plot of the vibration spectrum in a first color; and
generate the modifiable window in a second color that is different from the first color.

12. A method for analyzing vibration spectra associated with machine condition monitoring, the method comprising:
(a) collecting machine vibration data from one or more vibration sensors;
(b) performing a Fast Fourier Transform on the machine vibration data to generate a vibration spectrum that defines an amplitude of a first variable as a function of frequency;
(c) generating a spectral plot of the vibration spectrum for display on a display device, the spectral plot having an x-axis indicative of frequency and a first y-axis indicative of the amplitude of the first variable;
(d) generating a modifiable window within the spectral plot, the modifiable window displaying at least a portion of the vibration spectrum with reference to a second y-axis; and
(e) receiving input from a user interface device that specifies one or both of a change in position of the modifiable window along the x-axis of the spectral plot and a change in scale of the second y-axis.

13. The method of claim 12, wherein the first y-axis of the spectral plot includes a first label and a first scale, and the second y-axis of the modifiable window includes a second label and a second scale.

14. The method of claim 13, wherein the first label and the first scale are different from the second label and the second scale.

15. The method of claim 12 further comprising:
Step (d) including generating the modifiable window having a leading edge corresponding to a first frequency in the x-axis and a trailing edge corresponding to a second frequency in the x-axis;
Step (e) including receiving input from the user interface device that specifies one or both of a movement of position of the leading edge along the x-axis and a movement of position of the trailing edge along the x-axis; and
(f) regenerating the modifiable window having one or both of the leading edge and the trailing edge repositioned according to the one or more movements specified by the input from the user interface.

16. The method of claim 12 further comprising:
Step (e) including receiving input from the user interface device that specifies a change of scale of the second y-axis; and
(f) regenerating the modifiable window having the scale of the second y-axis changed as specified by the input from the user interface.

17. The method of claim 12 further comprising:
(f) receiving input from the user interface device that specifies a second variable to be plotted within the modifiable window instead of the first variable; and
(g) regenerating the modifiable window to display a spectral plot of the second variable as a function of frequency.

18. The method of claim 17 wherein step (g) includes applying a transfer function to the first variable within a frequency range defined by the modifiable window.

19. The method of claim 18 further comprising generating a plot of the transfer function that is applied to generate the spectral plot of the second variable.

20. The method of claim 17 further comprising updating a label and a scale of the second y-axis to conform with the second variable.

21. The method of claim 12 further comprising receiving input from the user interface device indicating a selection of the first variable to be displacement, velocity, or acceleration.

22. The method of claim 12 wherein:
Step (c) comprises generating the spectral plot of the vibration spectrum in a first color; and
Step (d) comprises generating the modifiable window in a second color that is different from the first color.

* * * * *